United States Patent
Yokoyama et al.

(10) Patent No.: US 11,679,815 B2
(45) Date of Patent: Jun. 20, 2023

(54) LIQUID DISCHARGE STRUCTURE

(71) Applicant: Yazaki Corporation, Tokyo (JP)

(72) Inventors: Satoshi Yokoyama, Toyota (JP); Yusuke Nagai, Toyota (JP); Makoto Goto, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 336 days.

(21) Appl. No.: 17/089,057

(22) Filed: Nov. 4, 2020

(65) Prior Publication Data

US 2021/0147005 A1 May 20, 2021

(30) Foreign Application Priority Data

Nov. 20, 2019  (JP) .............................. JP2019-209522

(51) Int. Cl.
*B62D 25/24* (2006.01)
*B60R 16/02* (2006.01)

(52) U.S. Cl.
CPC .......... *B62D 25/24* (2013.01); *B60R 16/0215* (2013.01)

(58) Field of Classification Search
CPC . B62D 25/24; B60R 16/0215; B60R 16/0238; B60R 13/07; B60R 16/02; H02G 3/088
See application file for complete search history.

(56) References Cited

U.S. PATENT DOCUMENTS

| 7,253,356 B2 * | 8/2007 | Kiyota ................. H05K 5/0056 |
| | | 361/678 |
| 2013/0335889 A1 | 12/2013 | Makino et al. | |

FOREIGN PATENT DOCUMENTS

| JP | S63172215 U | 11/1988 |
| JP | H08322124 A | 12/1996 |
| JP | 09-036559 A | 2/1997 |
| JP | 09-093757 A | 4/1997 |

* cited by examiner

*Primary Examiner* — Jacob M Amick
*Assistant Examiner* — Charles J Brauch
(74) *Attorney, Agent, or Firm* — Sughrue Mion, PLLC (57) ABSTRACT

A liquid discharge structure includes a bottom wall to be disposed tilted relative to a horizontal plane at a casing which is configured to be installed in a vehicle, a lateral wall arranged vertically at a lower end edge of the bottom wall, wherein the lower end edge is configured to be located on a lower side of the bottom wall being tilted, wherein the lateral wall has a discharge opening for liquid located at an end of the lateral wall closer to the bottom wall, a tubular rib wall projecting at least inwardly within the casing from the lateral wall so as to surround the discharge opening, and a partitioning rib wall which is arranged vertically on an inner surface of the bottom wall at a position closer to the lateral wall so that the partitioning rib wall extends intersecting a center axis of the tubular rib wall.

12 Claims, 5 Drawing Sheets

LIQUID DISCHARGE STRUCTURE

BACKGROUND OF THE INVENTION

Technical Field

The present invention relates to a liquid discharge structure which is configured to discharge liquid collected inside a casing installed in a vehicle.

Background Art

Conventionally, e.g. an electrical junction box, such as a relay box, and/or a protector for wire harness protection are installed in a vehicle. In this case, some of such components are intended to be disposed in a lower portion of the vehicle, wherein liquid, such as rain water from the outside of the vehicle and/or washing water, may enter such components in the lower portion. Therefore, a liquid discharge structure is oft provided in a casing, e.g. for an electrical junction box and/or a protector, wherein the liquid discharge structure is configured to discharge liquid collected inside the casing (see e.g. Patent Document 1).

Such a liquid discharge structure itself which is provided in the casing may form an access passage for the liquid from the outside. Therefore, a liquid discharge structure is proposed which discharges liquid collected inside the casing and further suppresses liquid being introduced from the outside (e.g. see Patent Document 2).

CITATION LIST

Patent Literature

Patent Document 1: JPH 09-093757 A
Patent Document 2: JPH 09-036559 A

SUMMARY OF THE INVENTION

A casing e.g. for an electrical junction box and/or a protector may be installed in a vehicle, with a bottom wall of the casing being tilted relative to a horizontal plane. In the liquid discharge structure as mentioned above, the casing being tilted may make it difficult to discharge liquid within the casing through a discharge opening and/or to suppress liquid being introduced from the outside. In these points, it is found that such a liquid discharge structure has room for improvement.

Therefore, the present invention is focused on such a problem, and an objective of the present invention is to provide a liquid discharge structure which can improve a discharge capacity for liquid within a casing and a suppression capacity for liquid being introduced from the outside, with the casing being installed in a tilted state.

In order to achieve the above-mentioned objective, a liquid discharge structure includes a plate-shaped bottom wall to be disposed tilted relative to a horizontal plane at a casing which is configured to be installed in a vehicle. The liquid discharge structure further includes a lateral wall which is a plate-shaped wall arranged vertically at a lower end edge of the bottom wall, wherein the lower end edge is configured to be located on a lower side of the bottom wall being tilted at the casing, wherein the lateral wall has a discharge opening for liquid collected within the casing, the discharge opening being located at an end of the lateral wall closer to the bottom wall. The liquid discharge structure further includes a tubular rib wall projecting at least inwardly within the casing from the lateral wall so as to surround the discharge opening. The liquid discharge structure further includes a partitioning rib wall which is arranged vertically on an inner surface of the bottom wall at a position closer to the lateral wall so that the partitioning rib wall extends intersecting a center axis of the tubular rib wall.

With the liquid discharge structure as described above, the discharge opening is disposed at the end of the lateral wall closer to the bottom wall, wherein the lateral wall is arranged vertically on the end edge of the bottom wall which represents the lower end edge when the bottom wall is tilted. The discharge opening thus arranged facilitates that liquid within the casing is moved along the tilted bottom wall and collected to the discharge opening to be discharged, which can enable the discharge capacity to be improved. Further, the tubular rib wall surrounding the discharge opening and the partitioning rib wall extending intersecting the center axis of the tubular rib wall provide for blocking liquid which attempts to enter the casing from the outside through the discharge opening, which can enable the suppression capacity for liquid entering to be improved. This means that the liquid discharge structure as described above can improve the discharge capacity for liquid within a casing and the suppression capacity for liquid entering from the outside, the casing being installed in a tilted state.

DETAILED DESCRIPTION OF THE PREFERRED EMBODIMENTS

Hereinafter, an embodiment of a liquid discharge structure will be described.

Figure 1:
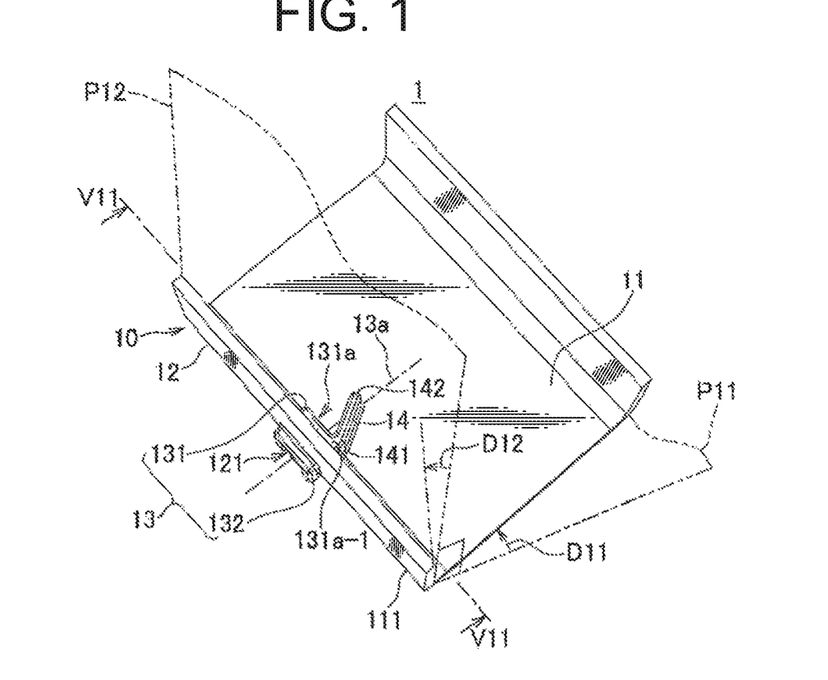
FIG. 1 shows a liquid discharge structure according to an embodiment in a perspective view from the inside of a casing.
Figure 2:
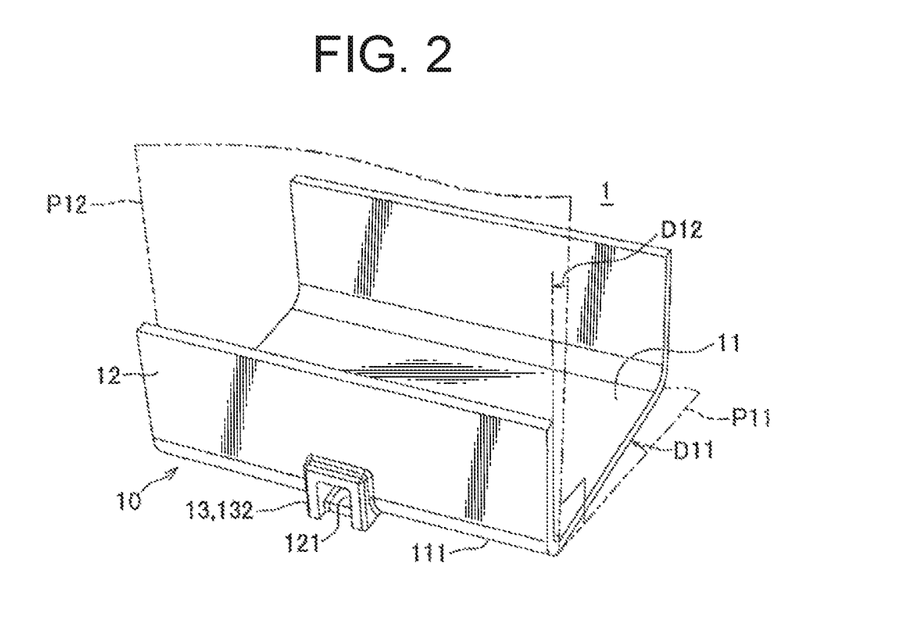
FIG. 2 shows the liquid discharge structure according to FIG. 1 in a perspective view on a discharge opening from the outside of the casing.
Figure 3:
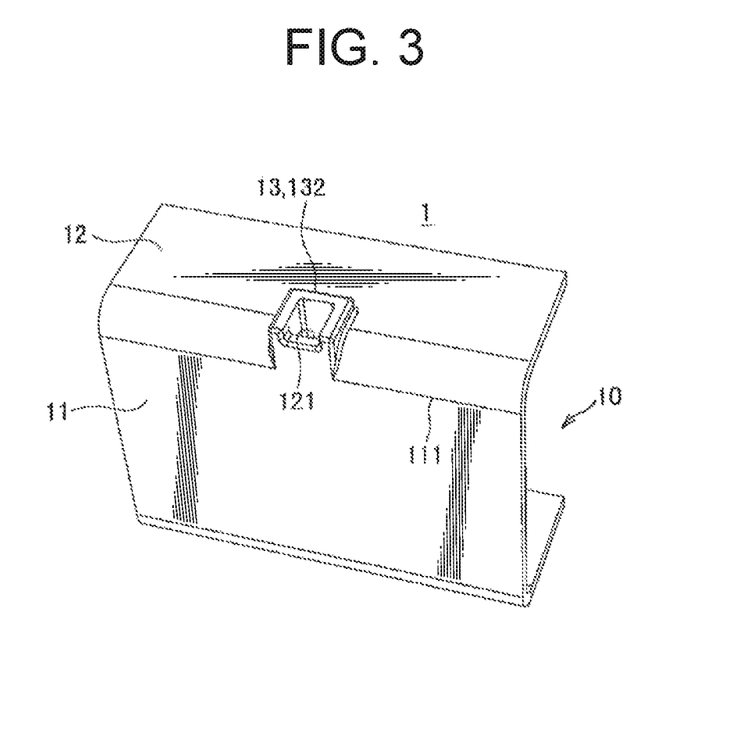
FIG. 3 shows the liquid discharge structure according to FIGS. 1 and 2 in a perspective view from the outside of the casing, wherein a discharge opening is viewed from downwards.

FIG. 1 shows a liquid discharge structure according to an embodiment in a perspective view from the inside of a casing. FIG. 2 shows the liquid discharge structure according to FIG. 1 in a perspective view on a discharge opening from the outside of the casing. FIG. 3 shows the liquid discharge structure according to FIGS. 1 and 2 in a perspective view from the outside of the casing, wherein a discharge opening is viewed from downwards;

The liquid discharge structure 10 according to the present embodiment is provided in a casing, such as a casing 1, as described below:

As used herein, the casing 1 is a casing for an electrical junction box or a protector to be installed in a vehicle, wherein the electrical junction box provides an electrical connection between wire harnesses or between a wire harness and another electric device, wherein the protector covers a wire harness and protects it, although the casing 1 is not limited here. The liquid discharge structure 10 is a structure for discharging liquid collected within such a casing 1, and includes a bottom wall 11 of the casing 1, a lateral wall 12 of the casing 1, a tubular rib wall 13, and a partitioning rib wall 14. In FIGS. 1 and 2, a horizontal plane P11 and a plumb plane P12 are shown together with the casing 1, wherein the plumb plane P12 extends orthogonally to the horizontal plane P11.

The bottom wall 11 is a wall having a rectangular plate shape which is arranged tilted upwards relative to the horizontal plane P11, as indicated by an arrow D11. The lateral wall 12 is a wall which is arranged vertically on a lower end edge 111 of the bottom wall 11 so as to extend orthogonally to the bottom wall 11, wherein it is configured so that the lower end edge 111 is located on a lower side of the bottom wall 11 being tilted. Due to the bottom wall 11 being tilted upwards relative to the horizontal plane P11, the lateral wall 12 is positioned tilted downwards relative to the plumb plane P12. At this time, the lateral wall 12 has a discharge opening 121 for liquid collected within the casing 1 which is located at an end of the lateral wall 12 closer to the bottom wall 11. Due to the lateral wall 12 tilted as described above, the discharge opening 121 is oriented downwards of the vehicle. The tubular rib wall 13 is a wall having a tubular shape which projects towards both of the inside and the outside of the casing 1 from the lateral wall 12 so as to surround the discharge opening 121, wherein the tubular rib wall 13 includes an inner rib wall 131 and an outer rib wall 132, the inner rib wall 131 extending inwardly from the lateral wall 12 and the outer rib wall 132 extending outwardly from the lateral wall 12. The discharge opening 121 is a quadrilateral hole, and the tubular rib wall 13 has a quadrilateral tubular shape. The partitioning rib wall 14 is arranged vertically on an inner surface of the bottom wall 11. This partitioning rib wall 14 extends intersecting a center axis 13a of the tubular rib wall 13. The partitioning rib wall 14 is further connected at one end edge 141 to an opening end edge of the tubular rib wall 13 inside the casing 1 i.e. to an opening end edge 131a of the inner rib wall 131. Furthermore, the partitioning rib wall 14 extends at a distance from the opening end edge 131a, wherein the distance is increased from the one end edge 141 to another end edge 142.

Figure 4:
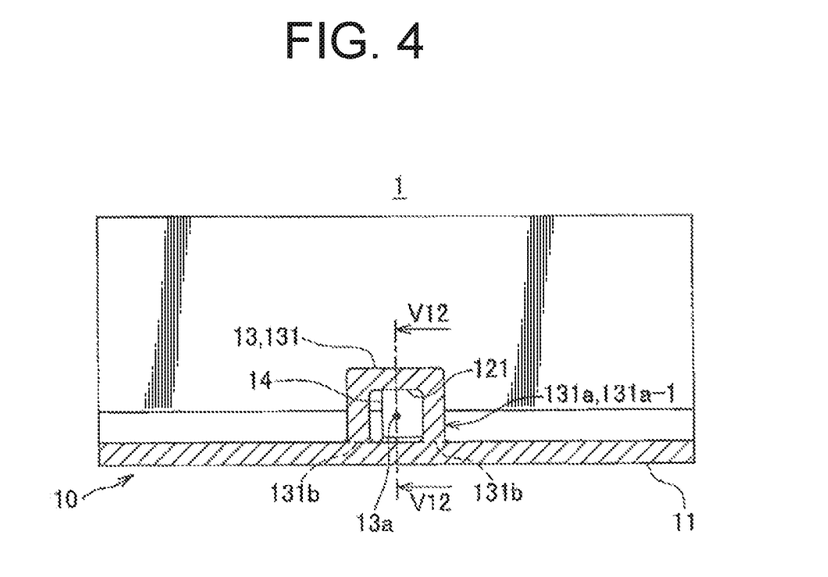
FIG. 4 is a sectional view of the liquid discharge structure according to FIGS. 1 to 3 along the line V11-V11 in FIG. 1 which extends through an inner rib wall.

FIG. 4 is a sectional view of the liquid discharge structure according to FIGS. 1 to 3 along the line V11-V11 in FIG. 1 which extends through the inner rib wall.

As shown in this FIG. 4, the discharge opening 121 in this liquid discharge structure 10 is defined on a side inside the casing 1 facing the bottom wall 11 by the inner surface of the bottom wall 11 to form a quadrilateral hole. The inner rib wall 131 of the tubular rib wall 13 is formed so as to surround the quadrilateral hole on three sides other than the side facing the bottom wall 11, wherein the inner rib wall 131 is connected to the bottom wall 11 at a pair of end edges 131b facing the bottom wall 11, wherein the inner rib wall 131 forms a tubular shape together with the bottom wall 11.

The partitioning rib wall 14 is a plate-shaped wall which extends obliquely from one end edge 131a-1 of a pair of end edges of the quadrilateral opening end edge 131a of the inner rib wall 131 as a part of the tubular rib wall 13 to extend intersecting the center axis 13a, the pair of end edges being opposed to each other and intersecting the inner surface of the bottom wall 11.

Further, as shown in FIGS. 2 and 3, the outer rib wall 132 as a part of the tubular rib wall 13 is formed in a tubular shape by cutting off a portion of the bottom wall 11 in a recessed form towards the lateral wall 12.

Furthermore, the liquid discharge structure 10 according to the present embodiment is configured by integrally moulding the bottom wall 11, the lateral wall 12, the tubular rib wall 13 and the partitioning rib wall 14 from resin.

The liquid discharge structure 10 as described above can achieve effects as described later. Before describing the effects, a reference for comparison with this liquid discharge structure 10 will be described first.

Figure 5:
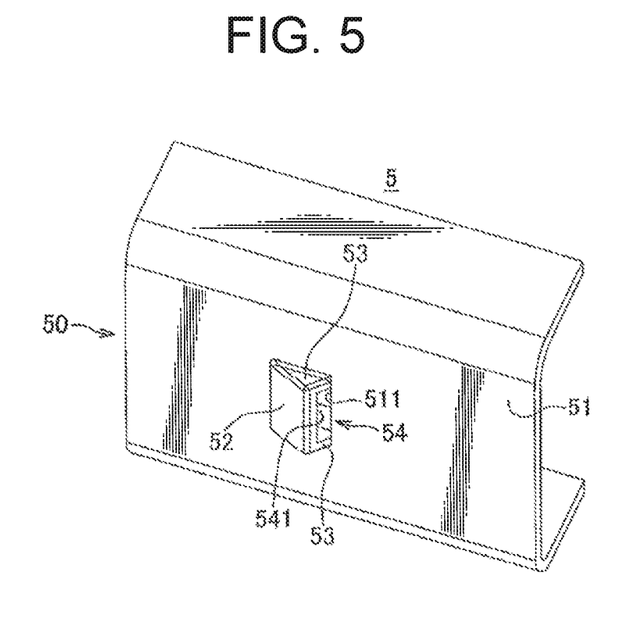
FIG. 5 shows a liquid discharge structure according to a reference for comparison with the liquid discharge structure according to FIGS. 1 to 4 in a perspective view from the outside of a casing.
Figure 6:
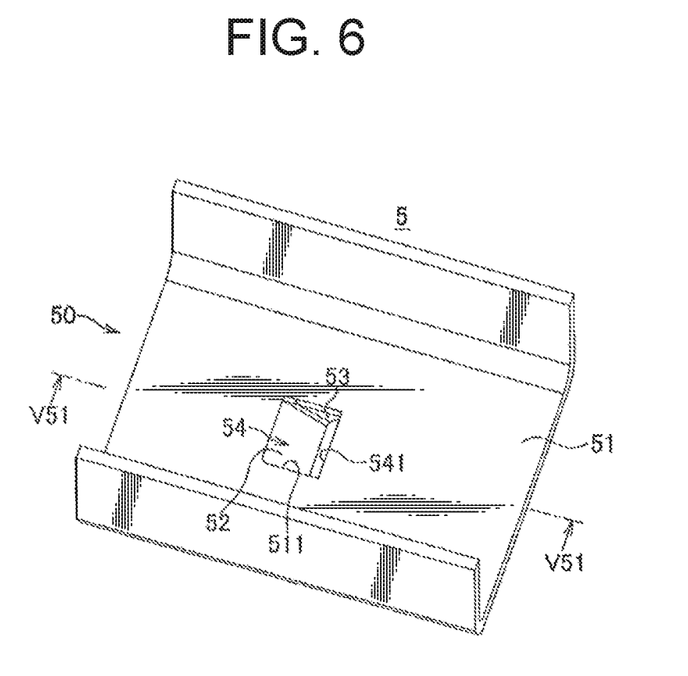
FIG. 6 shows the liquid discharge structure according to the reference as shown in FIG. 5 in a perspective view from the inside of the casing.

FIG. 5 shows a liquid discharge structure according to the reference for comparison with the liquid discharge structure according to FIGS. 1 to 4 in a perspective view from the outside of a casing. FIG. 6 shows the liquid discharge structure according to the reference as shown in FIG. 5 in a perspective view from the inside of the casing.

Likewise, the liquid discharge structure 50 according to the reference is a structure for discharging liquid collected within a casing 5, the casing 5 being installed in the vehicle, wherein the liquid discharge structure 50 includes a bottom wall 51 of the casing 5, a blocking wall 52, and a pair of vertical walls 53.

The bottom wall 51 is a wall having a flat plate shape, and provided with a discharge opening 511 for liquid which is collected within the casing. The blocking wall 52 is a tilted wall extending obliquely towards the outside of the casing 5 from an edge of the discharge opening 511. The vertical walls 53 are a pair of walls, each of the walls having a triangular shape, wherein the vertical walls 53 connect a pair of inner edges of the discharge opening 511 to a pair of lateral edges of the blocking wall 52, the pair of inner edges of the discharge opening 511 being opposed to each other. The blocking wall 52 and the pair of vertical walls 53 define the above-described discharge opening 511 which opens inwardly in the casing 5. As such, a discharge path 54 is defined with an external discharge opening 541 which is oriented externally from the casing 5, wherein the external discharge opening 541 is defined by the blocking wall 52, the pair of vertical walls 53 and a rear end edge of the discharge opening 511. With the liquid discharge structure 50 according to this reference, liquid collected within the casing 5 is discharged, while external liquid is prevented from entering, as described below.

Figure 7:
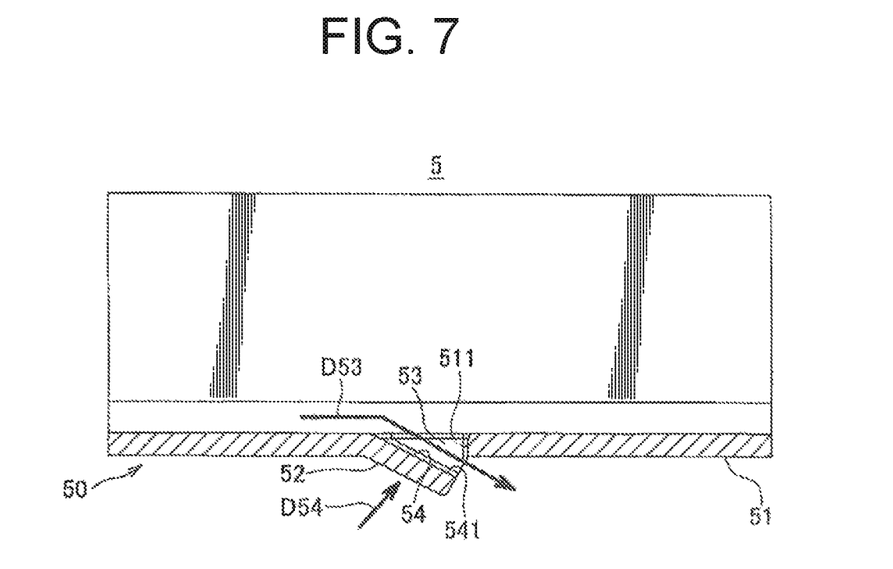
FIG. 7 is a sectional view along the line V51-V51 in FIG. 6 illustrating how liquid is discharged and prevented from being introduced in the liquid discharge structure according to the reference as shown in FIGS. 5 and 6.

FIG. 7 is a sectional view along the line V51-V51 in FIG. 6 illustrating how liquid is discharged and prevented from being introduced in the liquid discharge structure according to the reference as shown in FIGS. 5 and 6;

In the liquid discharge structure 50 according to the reference, liquid collected within the casing 5 flows through the discharge opening 511 in the bottom wall 51 into the discharge path 54, as indicated by an arrow D53. Then, the liquid flows through this discharge path 54 and is discharged in one direction through the external discharge opening 541. In the liquid discharge structure 50 according to this reference, liquid attempts to enter in another direction as indicated by an arrow D54, wherein the liquid is prevented from entering the casing 5 by blocking the liquid with the blocking wall 52 and the pair of vertical walls 53.

Figure 8:
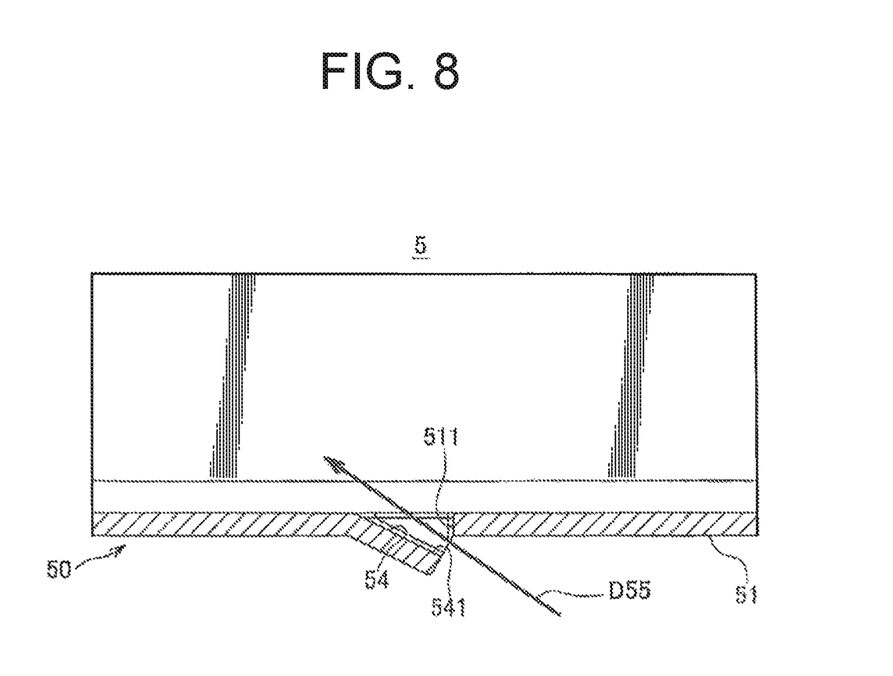
FIG. 8 is a sectional view similar to FIG. 7, wherein it is shown that there is a room for improvement in view of suppressing liquid entering from the outside in the liquid discharge structure according to the reference as shown in FIGS. 5 and 6.

It can be seen that the liquid discharge structure 50 according to the reference has room for further improvement of the discharge capacity, since the discharge opening 511 is located substantially at a center in the bottom wall 51, which makes it difficult to direct liquid within the casing 5 towards the discharge opening 511 when the bottom wall 51 is positioned in a tilted state. Also in view of suppressing liquid entering from the outside, there is also room for improvement as follows:

FIG. 8 is a sectional view similar to FIG. 7, wherein it is shown that there is a room for improvement in view of suppressing liquid entering from the outside in the liquid discharge structure according to the reference as shown in FIGS. 5 and 6.

As mentioned above, with the liquid discharge structure 50 according to the reference, it is prevented that liquid enters the casing 5 from the outside with regard to one direction. On the other hand, it may be allowed for liquid to enter the casing 5 via the external discharge opening 541, the discharge path 54, and the discharge opening 511 with regard to a direction as indicated by an arrow D55. As such, it can be also seen that the liquid discharge structure 50 according to the reference has room for further improvement in view of suppressing liquid entering from the outside.

Figure 9:
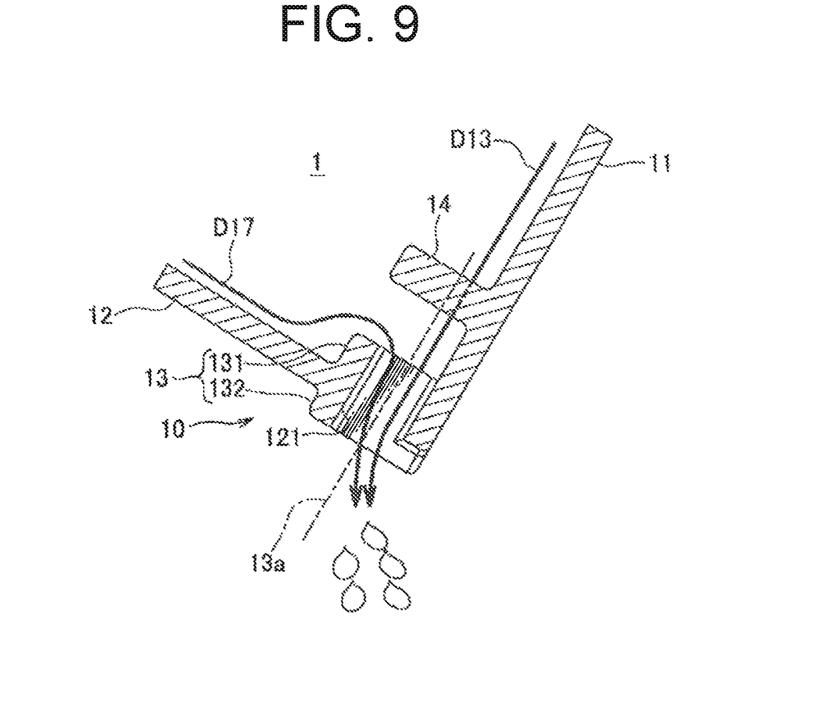
FIG. 9 is a sectional view along the line V12-V12 in FIG. 4 illustrating how the discharge capacity for liquid is increased in the liquid discharge structure according to FIGS. 1 to 4.

In contrast, the liquid discharge structure 10 as shown in FIGS. 1 to 4 can achieve effects as described below. First, the liquid discharge structure 10 can achieve improvement effects in view of the liquid discharge capacity as follows:

FIG. 9 is a sectional view along the line V12-V12 in FIG. 4 illustrating how the discharge capacity for liquid is increased in the liquid discharge structure according to FIGS. 1 to 4.

With this liquid discharge structure 10, the discharge opening 121 is disposed at the end of the lateral wall 12 closer to the bottom wall 11, wherein the lateral wall 12 is arranged vertically on the lower end edge 111 of the bottom wall 11 being tilted. The discharge opening 121 arranged in this manner facilitates that liquid within the casing 1 is moved along the tilted bottom wall 11 and collected to the discharge opening 121 to be discharged as indicated by an arrow D13, which can enable the discharge capacity to be improved.

Figure 10:
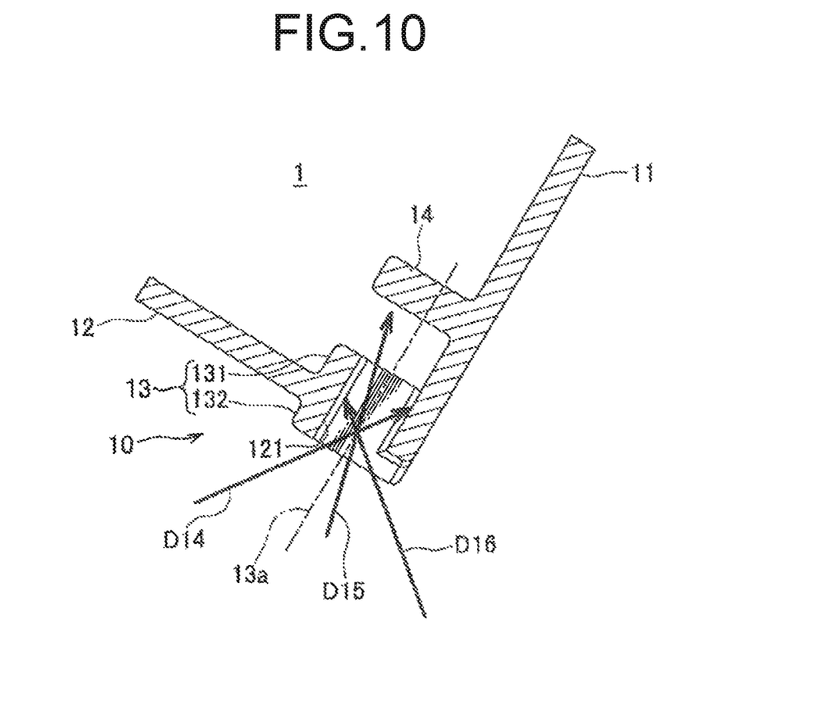
FIG. 10 is a sectional view similar to FIG. 9, wherein it is shown how the suppression capacity for liquid being introduced from the outside is increased in the liquid discharge structure according to FIGS. 1 to 4.

FIG. 10 is a sectional view similar to FIG. 9, wherein it is shown how the suppression capacity for liquid being introduced from the outside is increased in the liquid discharge structure according to FIGS. 1 to 4.

According to this liquid discharge structure 10, liquid coming from the outside in a plurality of directions attempts to enter the casing 1 through the discharge opening 121, as indicated by arrows D14 to D16, wherein the liquid is blocked in these directions by the tubular rib wall 13 and the partitioning rib wall 14 which surround the discharge opening 121. This means that the liquid discharge structure 10 can enable the increased suppression capacity for liquid being introduced.

As described above with reference to FIGS. 9 and 10, the liquid discharge structure 10 according to the present embodiment can improve the discharge capacity for liquid within the casing 1 installed in a tilted state as well as the suppression capacity for liquid entering from the outside.

According to the present embodiment, the lateral wall 12 is positioned tilted relative to the plumb plane P12 so that the discharge opening 121 is oriented downwards of the vehicle. With positioning the lateral wall 12 tilted in this manner, liquid within the casing 1 can be more easily moved additionally along the tilted lateral wall 12 and collected to the discharge opening 121, as indicated by an arrow D17. In addition, the collected liquid can be more easily discharged through the discharge opening 121 oriented downwards.

Further, according to the present embodiment, the partitioning rib wall 14 is connected at one end edge 141 to the opening end edge 131a of the tubular rib wall 13 within the casing 1, and extends at a distance from the opening end edge 131a, wherein the distance is increased towards the other end 142. Such an extension course can facilitate collecting liquid within the casing 1 to the discharge opening 121 by guiding the liquid with the partitioning rib wall 14, which can further increase the discharge capacity for liquid.

Here, the discharge opening 121 according to the present embodiment is defined on a side facing the bottom wall 11 by the inner surface of the bottom wall 11, wherein the inner rib wall 131 of the tubular rib wall 13 forms a tubular shape together with the bottom wall 11. With this configuration, liquid flowing along the inner surface of the bottom wall 11 is guided by the inner rib wall 131 which forms the tubular shape together with the bottom wall 11, which facilitates directing the liquid to the discharge opening 121 defined by the inner surface of the bottom wall 11 and can further increase the discharge capacity.

Furthermore, according to the present embodiment, the tubular rib wall 13 additionally projects from the lateral wall 12 towards the outside of the casing 1. The tubular rib wall 13 with the outer rib wall 132 projecting towards the outside facilitates blocking liquid flowing towards the discharge opening 121 from the outside, and further increase the suppression capacity for liquid intrusion.

Moreover, according to the present embodiment, the outer rib wall 132 of the tubular rib wall 13 is formed in a tubular shape by cutting off a portion of the outer rib wall 132 facing the bottom wall 11 in a recessed form towards the lateral wall 12. According to the present embodiment, liquid exiting the discharge opening 121 can be more easily discharged downwards due to the outer rib wall 132 being cut off on the bottom wall 11 side, i.e. on a lower side, which can further increase the discharge capacity.

Further, the discharge opening 121 according to the present embodiment is a quadrilateral hole, and the tubular rib wall 13 has a quadrilateral tubular shape. Additionally, the partitioning rib wall 14 is a plate-shaped wall which extends obliquely from one end edge 131a-1 of the quadrilateral opening end edge 131a of the inner rib wall 131 to intersect the center axis 13a, the one end edge 131a-1 intersecting the inner surface of the bottom wall 11. With this configuration, the plate-shaped partitioning rib wall 14 extending obliquely from the one end edge 131a-1 of the tubular rib wall 13 can block liquid better which attempts to pass through the discharge opening 121 into the inside from the outside, which can further increase the suppression capacity for liquid intrusion. In addition, the oblique plate-shaped partitioning rib wall 14 guides liquid within its inside to the discharge opening 121 better, which can further the discharge capacity.

Further, according to the present embodiment, the bottom wall 11, the lateral wall 12, the tubular rib wall 13 and the partitioning rib wall 14 are integrally moulded from resin. This configuration can reduce the number of components for the casing 1 including the liquid discharge structure 10, which can reduce the component costs for the casing 1.

Moreover, according to the present embodiment, the casing 1 is a casing for an electrical junction box or for a protector which protects a wire harness. With this configuration, the above-described liquid discharge structure 10 is applied to a casing for an electrical junction box or a protector which is oft disposed in a lower portion of a vehicle and thus subject to liquid intrusion from the outside. With such application, the effects and the capacities of this liquid discharge structure 10 can be utilized effectively.

It is to be noted that the embodiment as described above merely shows representative configurations for the liquid discharge structure, and the liquid discharge structure is not limited thereto, wherein various modifications may be carried out for implementation.

For example, the embodiment as described above schematically shows the casing 1 and omits description e.g. of its detailed shape. For the casing, any concrete shape etc. may be selected which has a plate-shaped bottom wall to be disposed tilted relative to a horizontal plane and a lateral wall arranged vertically at a lower end edge of the bottom wall.

Further, the embodiment as described above shows by way of example that the lateral wall 12 is arranged at the casing 1 on the lower end edge 111 of the bottom wall 11 at a right angle with the bottom wall 11 so that the discharge opening 121 is tilted relative to the plumb plane P12 to be oriented downwards of the vehicle. However, the lateral wall and the discharge opening are not limited thereto. For example, the lateral wall may be arranged vertically at an acute angle with the bottom wall to stand along the plumb plane, wherein the discharge opening may be formed in such a lateral wall so as to be opened exactly horizontally. However, as described above, by tilting the lateral wall 12 so as to position the discharge opening 121 oriented downwards can further facilitate collecting liquid to the discharge opening 121, and additionally discharging the collected liquid through the discharge opening 121.

Furthermore, the embodiment as described above shows the partitioning rib wall 14 by way of example which includes the one end edge 141 connected to the opening end edge 131a of the tubular rib wall 13, wherein the partitioning rib wall 14 extends at a distance from the opening end edge 131a, wherein the distance is increased towards the other end edge 142 of the partitioning rib wall 14. However, the partitioning rib wall is not limited thereto, but may be e.g. separate and provided spaced from the opening end edge of the tubular rib wall as far as the partitioning rib wall is arranged vertically on the inner surface of the bottom wall at a position closer to the lateral wall so as to extend intersecting to the center axis of the tubular rib wall. However, as described above as well, the extension course of the partitioning rib wall 14 connected to the opening end edge 131a of the tubular rib wall 13 as described above can further improve the discharge capacity for liquid.

Furthermore, the embodiment as described above shows by way of example that the discharge opening 121 is partially defined by the inner surface of the bottom wall 11 and the inner rib wall 131 is formed so as to surround the discharge opening 121 on three of its sides, wherein the inner rib wall 131 forms a tubular shape together with the bottom wall 11. However, the discharge opening and the inner rib wall are not limited thereto, but the discharge opening may e.g. extend through the lateral wall at a position spaced away from the bottom wall, wherein the inner rib wall may be e.g. formed in a tubular shape which surrounds an entire circumference of the discharge opening alone. However, by forming a tubular shape with the inner rib wall 131 and the bottom wall 11, the inner rib wall 131 surrounding the discharge opening 121 on three sides and the discharge opening 121 being partially defined by the inner surface of the bottom wall 11, it can be facilitated that liquid flows into the discharge opening 121, which can further increase the discharge capacity, as described above as well.

Further, the embodiment as described above shows by way of example the tubular rib wall 13 which additionally projects from the lateral wall 12 to the outside of the casing 1. However, the tubular rib wall is not limited thereto, but may project only to the inside of the casing. However, as described above as well, the suppression capacity for liquid entering can be further increased by the tubular rib wall 13 which additionally projects to the outside of the casing 1.

Moreover, the embodiment as described above shows by way of example that the outer rib wall 132 is formed in a tubular shape by cutting off a portion of the outer rib wall 132 facing the bottom wall 11 in a recessed form towards the lateral wall 12. However, the outer rib wall is not limited thereto, but may be e.g. formed in a tubular shape without a cut-off portion as described above. However, by forming the outer rib wall 132 in a tubular shape by cutting off a portion of the outer rib wall 132 facing the bottom wall 11 in a recessed form towards the lateral wall 12, it is possible to facilitate the downward discharge of liquid and to further increase the discharge capacity, as described above as well.

The embodiment as described above further shows by way of example that the discharge opening 121 is a quadrilateral hole, the tubular rib wall 13 is a quadrilateral tube, and the partitioning rib wall 14 is a plate-shaped wall which extends obliquely from the one end edge 131a-1 of the opening end edge 131a of the inner rib wall 131. However, the discharge opening, the tubular rib wall and the partitioning rib wall are not limited thereto, but may have any concrete shape respectively. However, the discharge opening 121, the tubular rib wall 13 and the partitioning rib wall 14 having the above-described shapes respectively can further improve the suppression capacity for liquid entering and the discharge capacity, as described above as well.

Moreover, the present embodiment as described above shows by way of example that the bottom wall 11, the lateral wall 12, the tubular rib wall 13 and the partitioning rib wall 14 are integrally moulded from resin. However, the configuration of the bottom wall, the lateral wall, the tubular rib wall and the partitioning rib wall is not limited thereto, but may be formed e.g. separately from each other and combined by means of adhesive or the like. However, as described above as well, the integral moulding can reduce the number of components and thus the component costs.

Moreover, the embodiment as described above shows by way of example that the casing 1 is a casing for an electrical junction box or a protector for protecting a wire harness. However, the casing may be configured for any concrete element as far as it is to be installed in a vehicle. However, by applying the liquid discharge structure 10 to an electrical junction box and/or a protector which is subject to liquid intrusion from the outside, it is possible to effectively utilize the effects and capacities of the liquid discharge structure 10, as described above as well.

REFERENCE SIGNS LIST

1 Casing
10 Liquid discharge structure
11 Bottom wall
12 Lateral wall
13 Tubular rib wall
13a Center axis
14 Partitioning rib wall
111 Lower end edge
121 Discharge opening
131 Inner rib wall
131a Opening end edge
131a-1, 131b End edges
132 Outer rib wall
141 One end edge
142 Other end edge
P11 Horizontal plane
P12 Plumb plane

What is claimed is:

1. A liquid discharge structure comprising:
   a plate-shaped bottom wall to be disposed tilted relative to a horizontal plane at a casing which is configured to be installed in a vehicle;
   a lateral wall which is a plate-shaped wall arranged vertically at a lower end edge of the bottom wall, wherein the lower end edge is configured to be located on a lower side of the bottom wall being tilted at the casing, wherein the lateral wall has a discharge opening for discharging liquid collected within the casing, the discharge opening being located at an end of the lateral wall closer to the bottom wall;
   a tubular rib wall projecting at least inwardly within the casing from the lateral wall so as to surround the discharge opening; and
   a partitioning rib wall which is arranged vertically on an inner surface of the bottom wall at a position closer to the lateral wall so that the partitioning rib wall extends intersecting a center axis of the tubular rib wall.

2. The liquid discharge structure according to claim 1, wherein the lateral wall is configured to be positioned tilted relative to a plumb plane so that the discharge opening is oriented downwards of the vehicle.

3. The liquid discharge structure according to claim 1, wherein the partitioning rib wall is connected at one end edge to an opening end edge of the tubular rib wall within the casing, and extends at a distance from the opening end edge, wherein the distance is increased towards another end.

4. The liquid discharge structure according to claim 1,
   wherein the discharge opening is defined on a side facing the bottom wall within the casing by the inner surface of the bottom wall, and
   wherein an inner rib wall of the tubular rib wall which projects inwardly from the lateral wall surrounds the discharge opening on three sides other than the side facing the bottom wall, wherein the inner rib wall is connected to the bottom wall at a pair of end edges facing the bottom wall, the inner rib wall forming a tubular shape together with the bottom wall.

5. The liquid discharge structure according to claim 1, wherein the tubular rib wall additionally projects from the lateral wall outside the casing.

6. The liquid discharge structure according to claim 5, wherein an outer rib wall of the tubular rib wall projecting outside the casing has a tubular shape by cutting off a portion of the outer rib wall facing the bottom wall in a recessed form towards the lateral wall.

7. The liquid discharge structure according to claim 1,
   wherein the discharge opening is a quadrilateral hole,
   wherein the tubular rib wall is a quadrilateral tubular wall, and
   wherein the partitioning rib wall is a plate-shaped wall which extends obliquely from one of a pair of end edges of a quadrilateral opening end edge of the tubular rib wall within the casing to intersect the center axis, the pair of end edges being opposed to each other and intersecting the inner surface of the bottom wall.

8. The liquid discharge structure according to claim 1, wherein the bottom wall, the lateral wall, the tubular rib wall and the partitioning rib wall are integrally moulded from resin.

9. The liquid discharge structure according to claim 1, wherein the casing is a casing for an electrical junction box or a protector to be installed in the vehicle, wherein the electrical junction box provide an electrical connection between wire harnesses or between a wire harness and another electric device, wherein the protector to configured to cover and protect a wire harness.

10. The liquid discharge structure according to claim 1, wherein the bottom wall is entirely disposed tilted relative to the horizontal plane.

11. The liquid discharge structure according to claim 1, wherein an inner rib wall of the tubular rib wall which projects inwardly from the lateral wall is provided in a region of the lateral wall, the region excluding a portion facing the bottom wall.

12. The liquid structure according to claim 1,
    wherein the bottom wall is entirely disposed tilted relative to the horizontal plane, and
    wherein an inner rib wall of the tubular rib wall which projects inwardly from the lateral wall is provided in a region of the lateral wall, the region excluding a portion facing the bottom wall.

* * * * *